United States Patent [19]

Buday

[11] Patent Number: 4,848,831
[45] Date of Patent: Jul. 18, 1989

[54] MOTOR HOME ASSEMBLY
[75] Inventor: John M. Buday, Saskatoon, Canada
[73] Assignee: Continental Coach Ltd., Canada
[21] Appl. No.: 89,500
[22] Filed: Aug. 26, 1987
[30] Foreign Application Priority Data
  Sep. 10, 1986 [CA] Canada .................................. 517913
[51] Int. Cl.⁴ ........................... B60P 3/34; B60D 7/00
[52] U.S. Cl. .................................... 296/165; 296/166; 296/26; 180/12; 292/115
[58] Field of Search ........................ 296/164–167, 296/172, 176, 26; 180/11, 12; 280/785; 403/13, 14, 306, 292, 378, 379, 382, 43, 46; 292/300, DIG. 39, DIG. 40, DIG. 38, DIG. 4, DIG. 5, DIG. 17, DIG. 43, 113, 115, 256.75

[56] References Cited
U.S. PATENT DOCUMENTS

| 1,222,549 | 4/1917 | Lark | 292/256.75 |
|---|---|---|---|
| 3,415,566 | 12/1968 | Kerrigan | 296/15 |
| 3,420,566 | 1/1969 | Obra | 296/166 |
| 3,586,119 | 6/1971 | Fullerton | 296/166 |
| 3,692,332 | 9/1972 | Pappatheodoru | 280/423 R |
| 3,817,545 | 6/1974 | Ward | 280/638 |
| 3,843,158 | 10/1974 | Schwellenbach | 280/403 |
| 4,241,948 | 12/1980 | Mori | 403/13 |
| 4,322,108 | 3/1982 | McPherson | 296/164 |
| 4,452,465 | 6/1984 | Bourke | 280/403 |
| 4,691,818 | 9/1987 | Weber | 403/292 |

FOREIGN PATENT DOCUMENTS

| 1112992 | 11/1955 | France | 292/115 |
|---|---|---|---|
| 893368 | 4/1962 | United Kingdom | 292/256.75 |

Primary Examiner—Johnny D. Cherry
Assistant Examiner—Joseph D. Pape
Attorney, Agent, or Firm—Welsh & Katz, Ltd.

[57] ABSTRACT

Recreational vehicles such a motor homes are either self-contained or consist of a cab-type drive unit with a fifth wheel connection for the motor home component. The present device comprises a motor home unit and a self-contained van unit with the units being close-coupled together as one rigid assembly. Full access is provided when connected between the van and the motor home and the van is readily detached and can be used as a self-contained separate vehicle for travelling towing a boat or the like. Connection is by detachable connecting the front ends of the longitudinal chassis members of the motor home unit to the rear ends of the longitudinal chassis members of the van and the van is a front wheel drive unit with steerable front wheels and selectively steerable rear wheels.

4 Claims, 2 Drawing Sheets

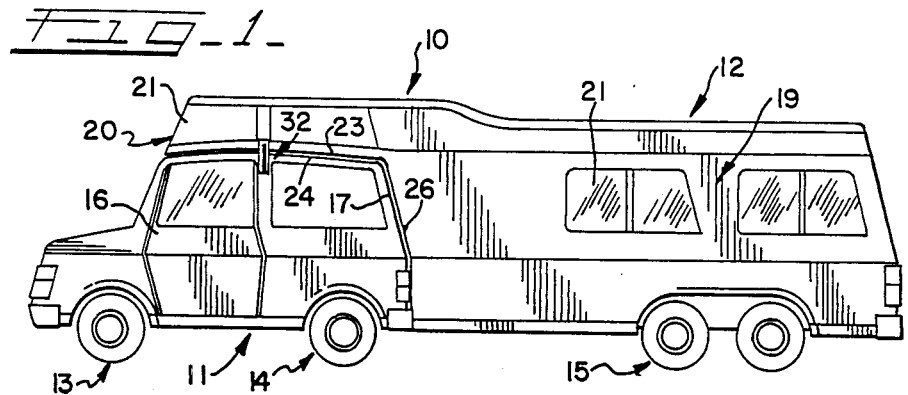
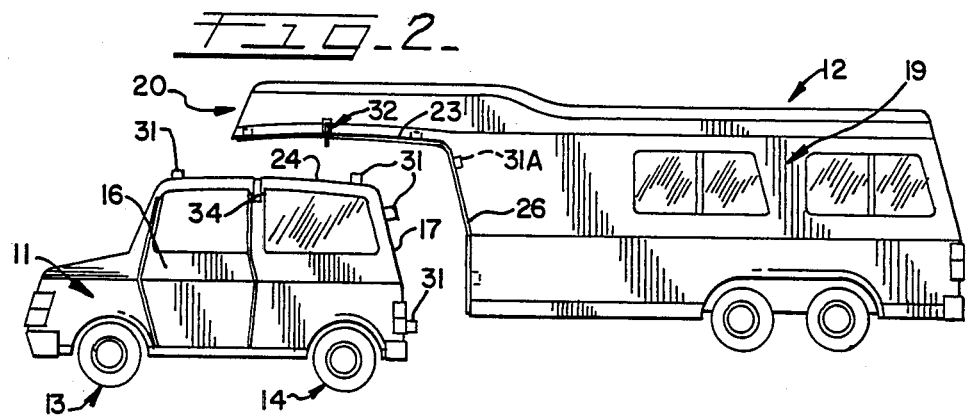
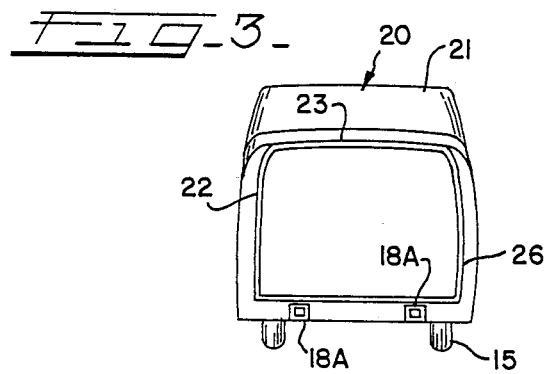
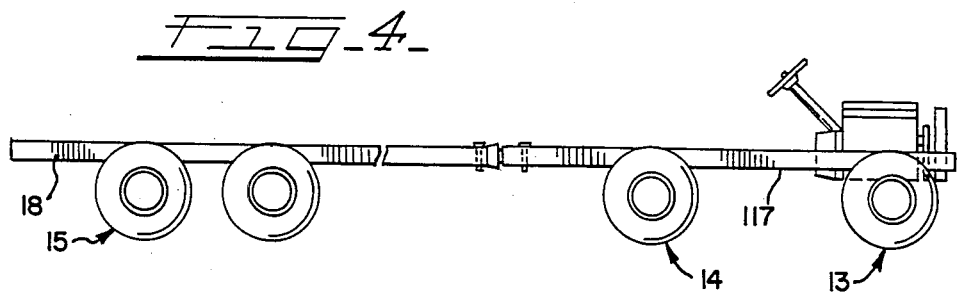

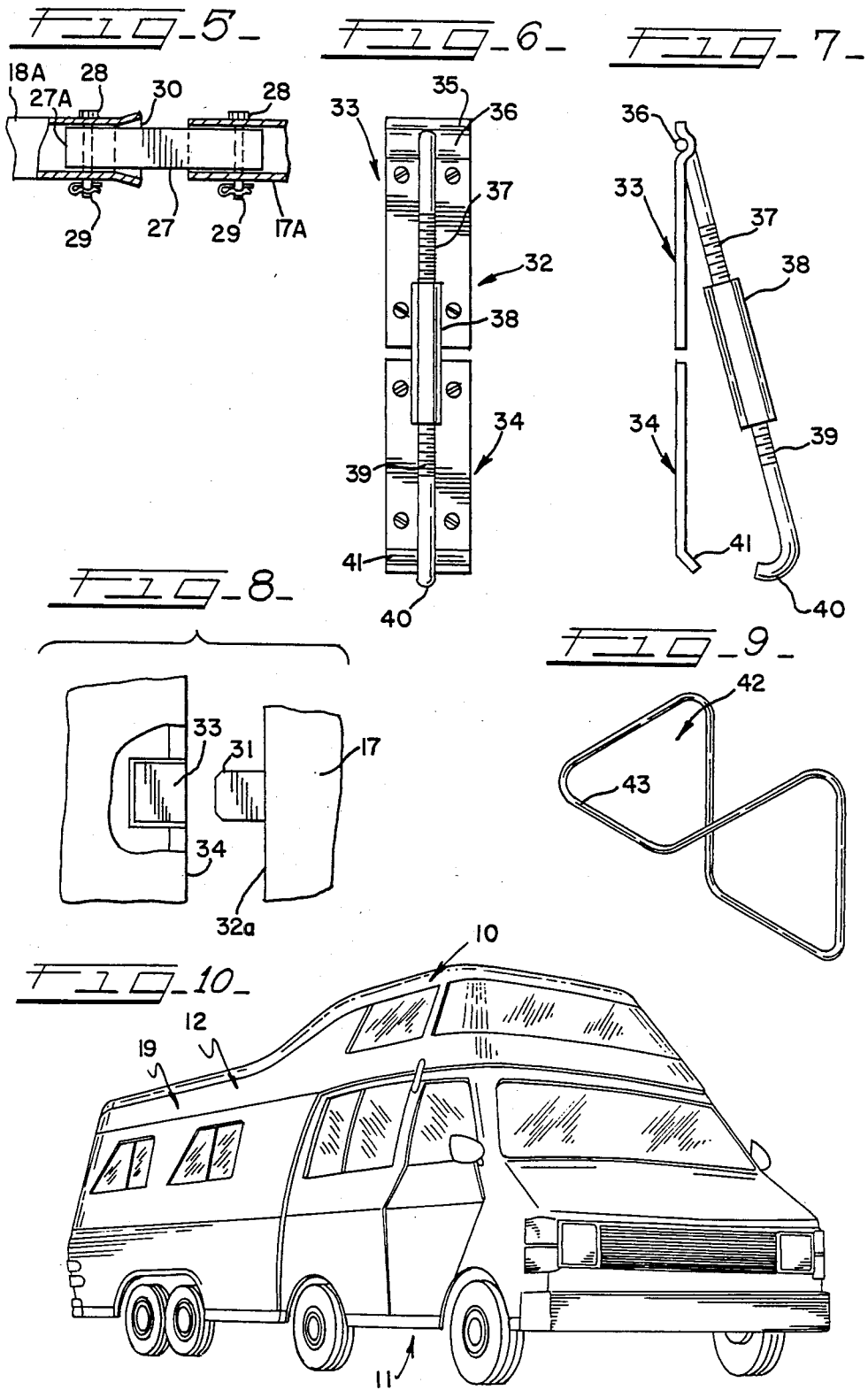

MOTOR HOME ASSEMBLY

BACKGROUND OF THE INVENTION

This invention relates to new and useful improvements in motor home assemblies.

Conventional motor homes are usually self-contained and although suitable for many purposes, one of the main disadvantages is the fact that the entire unit has to be driven if it is desired to travel locally once a campground or other location has been reached.

This disadvantage of motor homes is only overcome conventionally by towing a small car behind the motor home for use when parked, but this is unsatisfactory and relatively expensive.

Relatively large trailers are often pulled by fifth wheel connections to a cab unit which means that the cab unit can be detached and use locally but this is not a particularly satisfactory solution as these cab units are often relatively large and do not provide any storage accommodation when separated from the trailer component.

The present invention overcomes disadvantages inherent with current motor home and large trailer facilities by providing a motor home assembly consisting of a van unit as a tow vehicle and a trailer or motor home unit which, when travelling as one assembly, is close-coupled to the van unit with a rigid connection so that it becomes, in effect, a complete motor home assembly.

When parked, the van component is easily detached and can be used as a vehicle for local travel having the storage capacity of a van and also can be used to tow boats and trailer units therebehind. It will be appreciated that a conventional motor home cannot tow both a small car for local use and a boat and trailer unit at the same time.

Accessibility is maintained because of complete access between the van unit and the motor home unit when connected together and the assembly is easy to drive, handle and comfortable to travel in. Because of the aerodynamic design of the coupled unit, superior gas mileage is obtainable compared to similar sized units.

One aspect of the invention is therefore to provide a motor home assembly comprising in combination a front wheel drive van unit have steerable front wheels and selectively steerable rear wheels, and a motor home unit including at least one pair of wheels, means cooperating between said van unit and said motor home unit to selectively close-couple said units together as one rigid assembly and in sealed relationship one with the other.

Another advantage of the assembly is to provide a completely versatile assembly easily separated into two units thereby permitting the motor home component or unit to be parked at a permanent site while the towing van unit is available for use as a vehicle which can be used when not connected to the motor home unit thereby saving the cost and convenience of a second vehicle.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 1 is a side elevation of the complete assembly connected together.

FIG. 2 is a view similar to FIG. 1 but showing the two units separated.

FIG. 3 is a front elevational view of the motor home or trailer unit per se.

FIG. 4 is a schematic side elevation of the chassis of FIG. 1 showing the connection between the two units.

FIG. 5 is a fragmentary enlarged view of the connection between the two units.

FIG. 6 is an enlarged front elevation of one of the latch assemblies.

FIG. 7 is a side elevation of FIG. 6.

FIG. 8 is an enlarged fragmentary view showing one of the connecting plates between the two units.

FIG. 9 is an isometric view of the sealing gasket per se utilized between the two units when connected together.

FIG. 10 is a perspective view of the complete assembly of the subject invention showing the motor home component connected to the van unit.

In the drawings like characters of reference indicate corresponding parts in the different figures.

DETAILED DESCRIPTION

Proceeding therefore to described the invention in detail, reference should first be made to FIG. 1 in which the mobile home assembly is collectively designated 10 and includes a van unit collectively designated 11 and a motor home unit collectively designated 12.

The van unit is of necessity, a front wheel drive unit having steerable front wheels 13 and rear wheels 14 which are selectively steerable. By this is meant that when the motor home unit is connected to the van unit, it is necessary to have steerable rear wheels 14 but when the units are separated as shown in FIG. 2, the rear wheels can be locked in the straight ahead position. This is because, when the motor home unit 12 is secured to the van unit 11, it is in effect, one rigid vehicle with the motor home unit being supported by the van as will hereinafter be described and being provided with dual rear wheel assemblies collectively designated 15. Without steerable rear wheels 14 to the van unit under these conditions, the entire assembly would not track correctly.

Vehicles having front wheel drive and steerable front wheel assemblies with selectively steerable rear wheel assemblies are manufactured by, among others, a Netherlands company, namely, Terberg Benschop B.V., Benschop, Holland so that it is not believed necessary to provide structural details of the steerable rear wheel assemblies nor the method of locking up these wheels in the straight ahead position, selectively, when required.

The van unit 11 also includes a body 16, the interior appointments of which may be as desired and the rear side 17 thereof may be provided with doors (not illustrated) which may be removed and stored or folded inwardly or may consist of roll-type doors either opening and closing from the sides or from the top all of which constructions are well known in the art.

The van unit also includes a pair of spaced and parallel, longitudinally extending chassis frame members 117 which are in the form of hollow box frame members at least at the rear ends 17A, the purpose of which will hereinafter be described.

The motor home or trailer unit 12 is also mounted on a pair of spaced and parallel longitudinally extending chassis members 18, one of which is shown in the drawings and these are also hollow box frame members at least at the front ends 18A as will hereinafter be described. These chassis members support the aforementioned dual wheel assemblies 15 and the body portion collectively designated 19.

This body is preferably made of fiberglass of conventional construction and interior appointments and the body 19 is provided with a forwardly extending upper portion collectively designated 20 known as a "cabover" configuration. Both the body 19 and the front portion 20 may be provided with windows 21 as is conventional.

FIG. 3 shows a front elevation of the motor home or trailer unit per se with the front wall portion 22 being open and having a configuration similar to that shown in FIG. 3.

When connected together, the profile of the front of the trailer unit 12 is similar to the profile of the body portion of the van unit engaged by the trailer with the underside closed portion 23 of the forwardly extending portion 20 engaging upon the roof 24 of the van unit and with the lower front wall 26 of the trailer unit having a similar configuration to the rear wall 17 of the van unit so that when connected they become integral and due to the connections therebetween, which will hereinafter be described, become also a rigid one piece assembly.

The front wall 26 of the trailer unit is also open with the opening mating with the opening at the rear of the van and may also be provided with closure means such as removable or folding doors or the like (not illustrated), such closure being required of course when the two units are separated as shown in FIG. 2. However, normally they may remain open so that full access is provided between the van unit and the trailer unit when coupled together as shown in FIG. 1.

Means are provided to detachably connect the two units together and reference should be made firstly to FIGS. 4, 5 and 8.

The main connection between the two units is between the corresponding ends of the longitudinal frame members 117 and 18, it being understood that the width and height of these corresponding frame members is substantially equal both on the van unit and on the trailer unit.

A connector collectively designated 27 is shown in FIG. 5 and consists of an elongated, rectangular cross-section member having a cross-sectional configuration similar to the internal cross-sectional configuration of the chassis members and slideable therein. One end of these connectors engages the end 17A of the van members 117 and is detachably connected thereto by means of a pin 28 extending through apertures in the wall of the chassis member 17A and also through the engaged portion of the connector 27. Spring pins 29 detachably retain the connecting pins 28 in position.

The other ends 27A of these connectors may be tapered slightly to facilitate engagement into the corresponding trailer chassis ends 18A. These also may be detachably held in position by means of connecting pins 28 and spring pins 29.

Although the mating ends 17A and 18A of the chassis members 117 and 18 respectively are shown spaced apart for clarity, nevertheless it will be appreciated that, when assembled, they should be relatively close together.

It is desirable that the distal end of the portion 18A of the chassis member be provided with a divergent throat 30 once again to facilitate the engagement of the connectors 27 when backing the van unit to the trailer unit for connecting one with the other.

When connecting the van unit to the trailer unit, it is preferable that the connectors be engaged with the van unit by means of pins 29 and then the van unit may be backed into position to the front of the trailer unit with the ends 27A of the connectors entering the ends 18A of the connector receptacles formed on the ends of the chassis members. Once in position, the pins 28 are inserted and spring pins 29 engaged to prevent displacement of pins 28.

When moving to the engaged position, it should be noted that a plurality of metal plates 31 are provided around the periphery of the van and one of these plates is shown in FIG. 8. Reference character 31 also is shown in FIG. 2 indicating preferred locations of these plates and it will be appreciated that there are four of such plates on each side of the van profile.

These plates are rectangular and extend rearwardly from the van profits 32a and engage with resilient pads 33 provided at similar mating locations around the profile 34 of the trailer assembly thus assisting in registering the van profile with the trailer profile.

At the same time, once engaged, latch assemblies 32 become aligned. These latch assemblies consist of two portions, a trailer portion 33 and a van portion 34 and these are shown in detail in FIGS. 6 and 7. The portion 33 consists of a plate 35 secured to each side of the forwardly extending upper portion 32 adjacent the lower edge .23. A pivot pin 36 supports a threaded rod 37 adjacent the upper end of plate 35 which in turn engages with a turn buckle 38 and a further screw-threaded rod 39 having a hooked lower end 40.

Portion 34 also consists of a plate secured to each of the upper sides 24 of the van body 16 and these plates have an out-turned lower edge portion 41 engageable by the hooked end 40 so that when the turn-buckle is tightened, it pulls the upper portion of the trailer downwardly into contact with the roof of the van.

A resilient rubber or synthetic gasket collectively designated 42 is shown in FIG. 9 and is secured to the profile of the front of the trailer unit as by adhesive or the like. It consists of an upper substantially rectangular portion 43 which is secured around the periphery of the lower side 23 of the forwardly extending portion 21 of the trailer unit and a substantially vertical portion which is secured around the frame or wall 22 defining the open front 26 of the trailer unit so that when the two units are connected together as aforesaid, they are not only rigidly connected but they are in sealable relationship one with the other.

It will therefore be appreciated that the close-coupled rigid assembly as shown in FIG. 1 is easily operated and steered with the steerable rear wheels 14 and that the two units are easily attached and separated one from the other thus leaving the van to be utilized as an independent vehicle once parked on location.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A motor home assembly comprising in combination a front wheel drive van unit including a rear wall and having steerable front wheels and selectively steerable rear wheels, and a motor home unit including at least one pair of wheels and having an upper front wall and a lower front wall, cooperating means between said van unit and said motor home unit to selectively close-couple said units together as one rigid assembly and in sealed relationship one with the other, said cooperating means including at least two spaced and parallel connectors adjacent each side of said van unit at the bottom of the rear wall thereof, and corresponding connector receptacles adjacent each side of said motor home unit at the bottom of the lower front wall thereof, said connectors detachably engaging said receptacles when said units are in rigid assembly, alignment means consisting essentially of a plurality of plates secured at spaced intervals about the rear wall of said van unit and extending therefrom, and resilient pads about the lower front wall of said motor home unit van unit with said motor home unit.

2. The assembly according to claim 1 in which said van unit includes a pair of spaced and parallel, longitudinally extending box frame members, said motor home unit includes a pair of spaced and parallel, longitudinally extending box frame members, the transverse distance between said box frame members of said van unit being substantially equal to the transverse distance between said box frame members of said motor home unit, said receptacles forming part of the corresponding ends of said box frame members, said connectors selectively and detachably extending between said corresponding box frame members.

3. The assembly according to claim 2 in which said connectors have a cross-sectional configuration similar to the cross-sectional configuration of said box frame members and being slideable therein, expanded throat means on the ends of the box frame members of at least one of said units for guiding and receiving the corresponding connectors to facilitate the mating engagement of one with the other, and retaining bolts extending through the walls of said box frame member and said connector thereby detachably securing one with the other.

4. The assembly according to claim 1 in which said motor home unit includes a forwardly extending upper portion engaging over the upper side of said van unit when rigidly connected thereto, the configuration of the engaging portion of said motor home unit, transversely, longitudinally and vertically, being similar to the configuration of the portion of said van unit engaged thereby, locating means spaced around the profile of one of said units where it engages with the profile of the other of said units and a sealing gasket extending around the profile of one of said units engaged by the profile of the other of said units whereby said units are in sealable relationship around said profiles when connected together as aforesaid.

* * * * *